Patented June 24, 1930

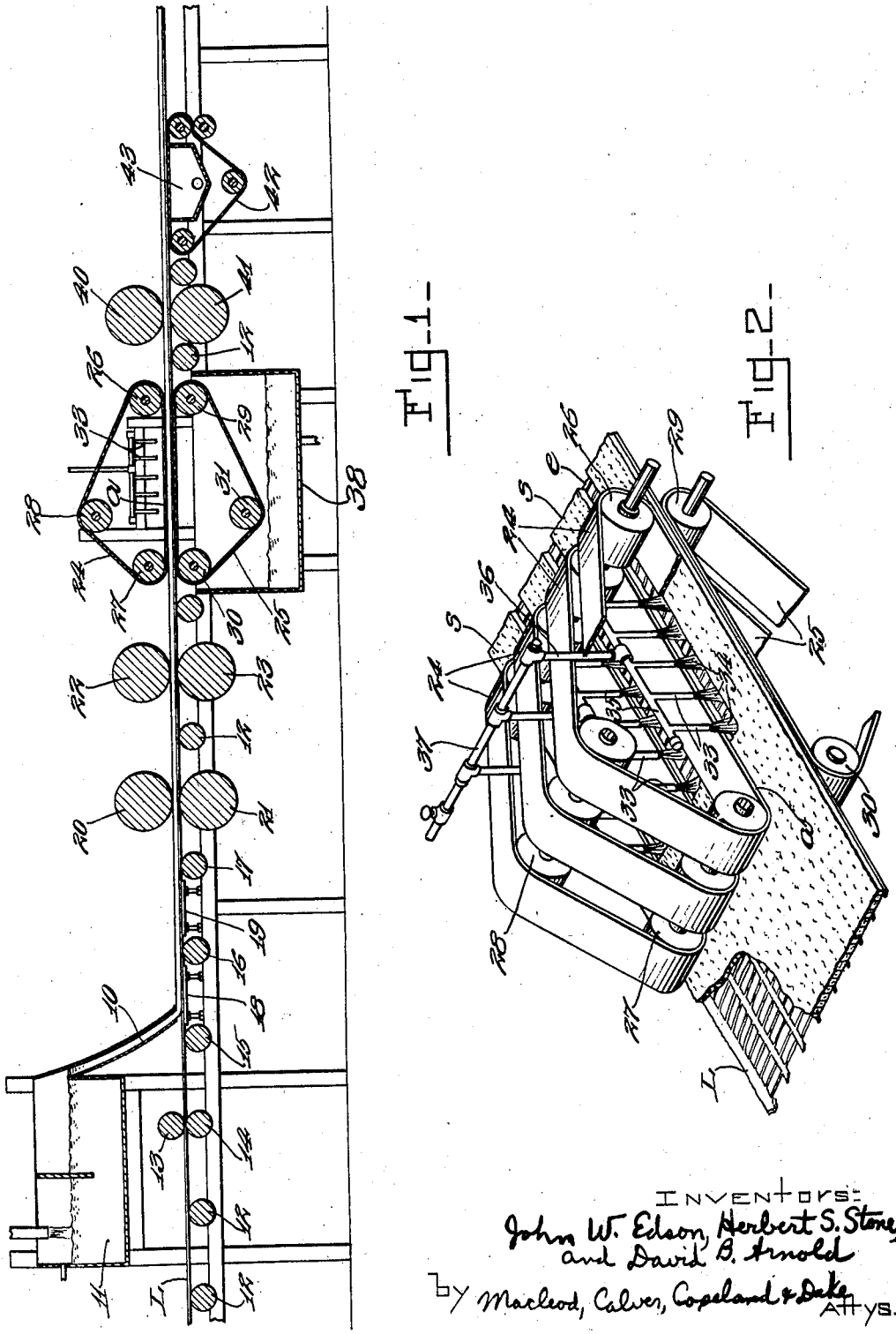

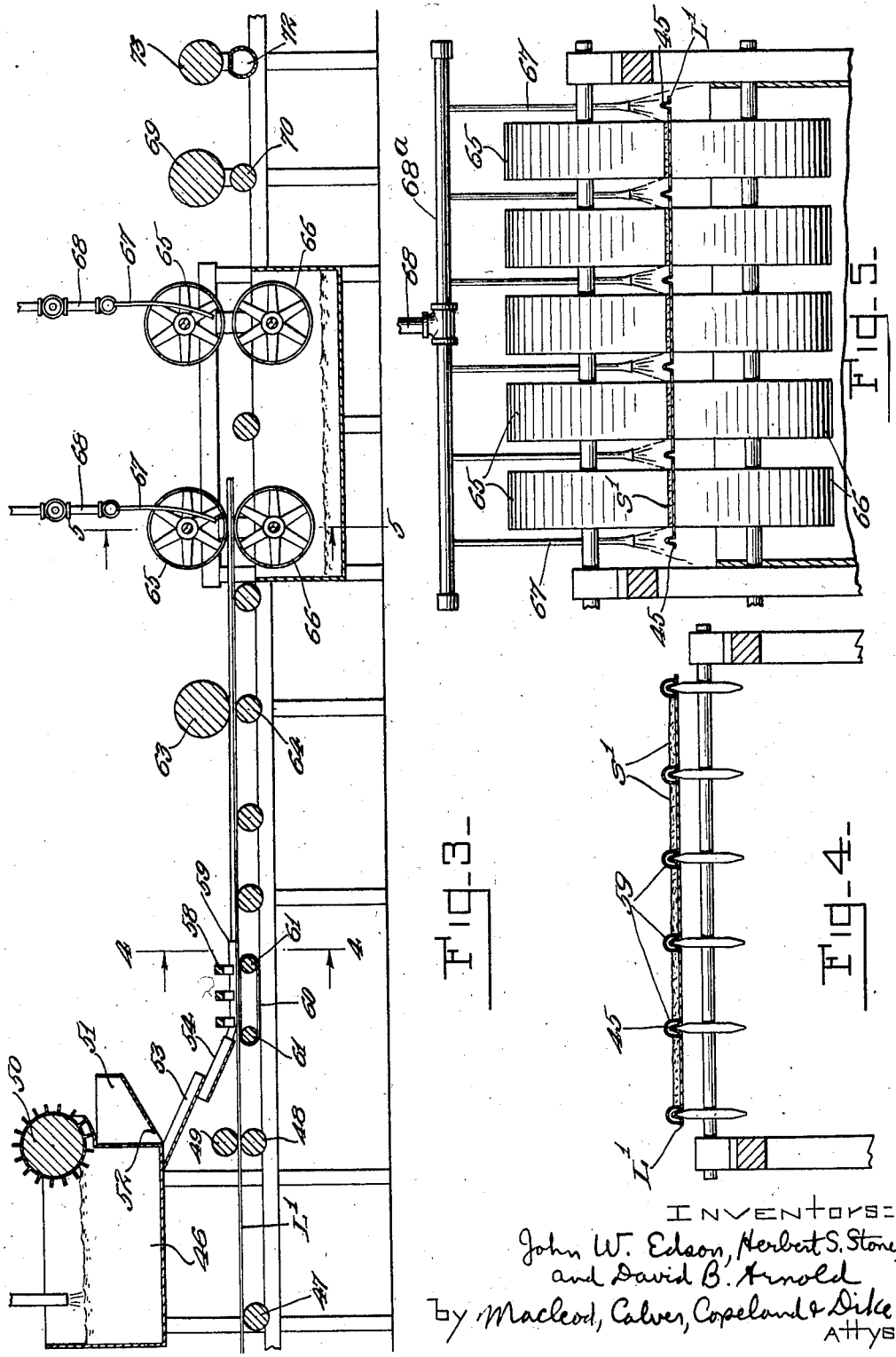

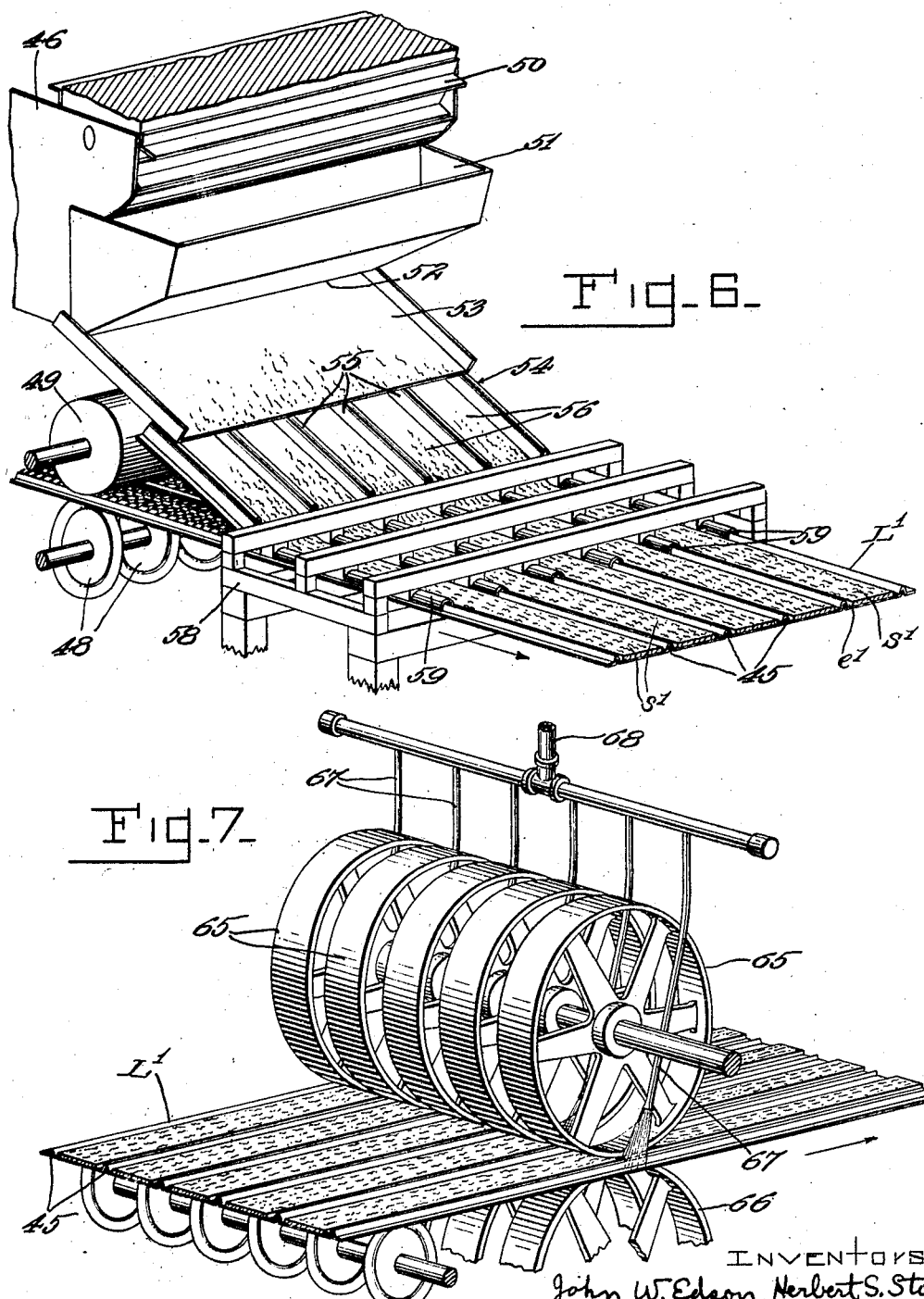

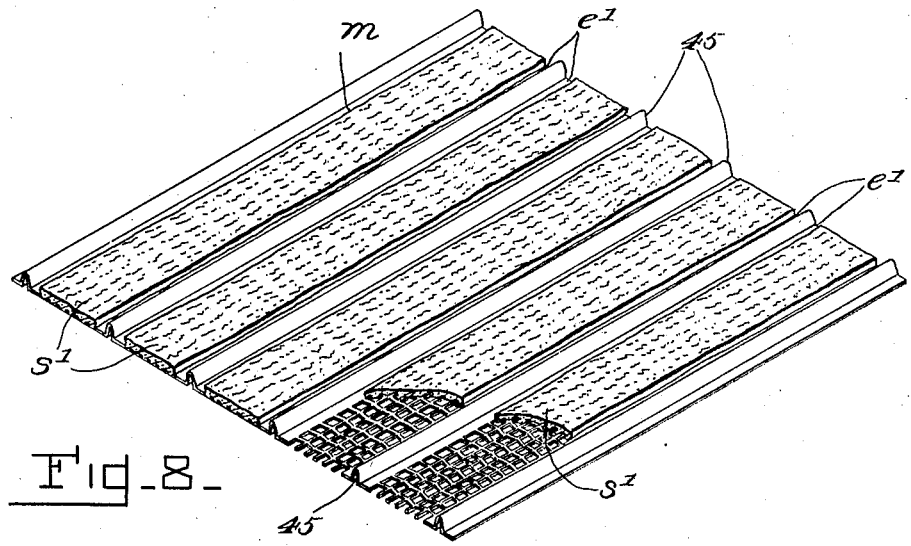
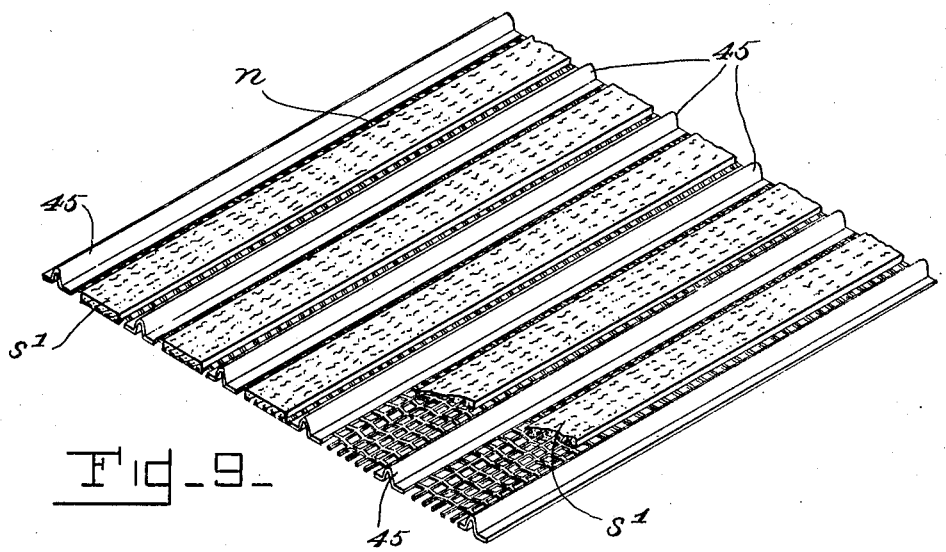

1,765,571

UNITED STATES PATENT OFFICE

JOHN W. EDSON, OF CAMBRIDGE, HERBERT S. STONE, OF WALPOLE, AND DAVID B. ARNOLD, OF BROOKLINE, MASSACHUSETTS, ASSIGNORS TO EASTERN EXPANDED METAL COMPANY, OF CAMBRIDGE, MASSACHUSETTS, A CORPORATION OF MASSACHUSETTS

METHOD AND APPARATUS FOR MAKING LATH MATERIAL

Application filed September 29, 1928. Serial No. 309,278.

In the prior application of Robert H. Sagendorph, filed November 8, 1926, Serial No. 146,880, there is shown a building material or plaster saving lathing material which comprises metal lath included in a mass of fibrous material the whole being secured together by the entanglement of the fibres with each other and about the strands of the expanded metal. The most satisfactory form of this material for certain purposes has independent longitudinal areas or strips of the fibrous material separated from each other by intermediate areas or strips which are not coated with the fibrous material. This material approximates wood lathing and permits the plaster to be bonded directly to the expanded metal wherever the expanded metal is exposed. Our present invention has for its object a method and apparatus for manufacturing the material shown and particularly the material in strip form. However broadly considered it is also possible to employ our improved method in the manufacture of material of the kind described in which the exposed areas are holes instead of longitudinal strips.

The invention will be fully understood from the following description when taken in connection with the accompanying drawings and the novel features thereof will be pointed out and clearly defined in the claims at the close of this specification.

Fig. 1 is a longitudinal section of a machine embodying our invention.

Fig. 2 is a view in perspective of the portion of the machine which forms the exposed areas of the metal lath.

Fig. 3 is a longitudinal section of a machine embodying a modified form of the invention.

Figs. 4 and 5 are sectional views taken along lines 4—4 and 5—5 respectively of Fig. 3.

Fig. 6 is a perspective view of a portion of the machine shown in Fig. 3 for applying the fibrous material upon the metal lath.

Fig. 7 is a perspective view of a portion of the machine for trimming the edges of the fibrous strips.

Figs. 8 and 9 are perspective views of a portion of the lath material after it first receives the strips of fibrous material and after the edges of the strips have been trimmed respectively.

Referring now to the drawings, at 11 is shown a suitable reservoir or stock chest containing the pulp suspended in water beneath which is located a bed or conveyor provided with a series of rolls 12 along which the metal lath L passes through the machine. At 13, 14 is shown a pair of feed rolls between which the metal lath passes and by which it is fed forward. The pulp from the stock chest 11 flows down through a spout or chute 10 onto the metal lath as it passes over the bed rolls 15, 16 and 17. Between these bed rolls are located adjustable plates 18 and 19 which prevent the leading edge of the sheet of the metal lath bending down and becoming displaced, and also prevent an injurious rush of the water in the pulp through the sheet. The pulp from the stock chest pours onto the sheet of metal lath and lays an even layer on the top surface and some parts of the pulp pass down through the meshes thus surrounding the strands and enclosing them. At this time the fibrous material contains a very large percentage of water which must be removed and this is removed by two pairs of squeeze rolls 20, 21 and 22, 23. These roll down the fibre consolidating and compacting it and at the same time remove a large part of the water content. The method and apparatus thus far described forms over the entire area of the sheet a layer of pulp which is still wet and loose but from which the larger part of the water has been removed.

The sheet of material then passes through the hole-forming mechanism which is shown more completely in Fig. 2. The object of this mechanism is to remove from predetermined areas of the sheet the fibre attached thereto and thus expose the strands of the metal lath. This is accomplished by forcibly removing, as by washing off, the pulp over the predetermined areas $e$ and at the same time protecting the other areas $s$ so that the fibre on them will not be injured, torn away or loosened. The material to be produced by the machine shown in the drawings is in the strip form to approximate wood lath. The mechanism for removing this material consists primarily of a series of nozzles to eject a fluid, such as water, and a movable member, such as belts or rolls, to enclose and protect the portions s of the material which are not to be removed. In Figs. 1 and 2 of the drawing we have shown upper and lower belts in sets of four each, the upper ones being designated 24 and the lower ones 25. The upper belts run over rolls 26 and 27 and are tightened by rolls 28. The lower belts likewise run over rolls 29, 30 and are tightened by rolls 31. Each of the upper belts has a flat or horizontal run, one of which is shown at $a$ which lies closely in contact with the upper surface of the sheet. The portion of the sheet which is to form the strip of fibrous material in the finished product is therefore enclosed on its upper and lower sides between the straight runs of the two belts and is thus fully protected from the action of the water, or other fluid, as it is ejected from the nozzles located between the belts as will now be described.

In practice between each pair of belts is located a series of nozzles 33 from which water or other fluid, is ejected forcibly as indicated at 34. These nozzles are conveniently connected to headers 35 supplied by risers 36 from a main 37. The water is ejected from the nozzles with considerable force and washes and tears the moist fibrous material from the strands of expanded metal leaving them bare and exposed to receive the plaster. The fibrous material thus removed falls into a chest 38 from which it is returned to the beater or stock chest not shown.

In this way there is no loss of fibre or of water as the water used in removing the fibre from the exposed areas is in turn used wholly or in part in the formation of the pulp.

After leaving the washing device the material passes through another pair of squeeze rolls 40, 41 to squeeze out additional moisture and on to a wire apron 42 over a suction box 43 by means of which further moisture is withdrawn from the material. Thereafter the material is dried in any convenient manner.

In Figs. 3 to 9 inclusive there is illustrated a modified form of apparatus which is particularly adapted for the practice of the invention as applied to an expanded metal lath of the type shown having a plurality of spaced longitudinally extending ribs 45. This apparatus comprises a suitable reservoir or stock chest 46 containing fibrous pulp suspended in water beneath which is located a bed or conveyor provided with a series of rolls 47 along which the metal lath L' passes through the apparatus. Lower and upper feed rolls 48 and 49 respectively are provided between which the metal lath passes and by which it is fed forward, one of these rolls, for example, the lower roll 48, is ribbed to engage the rib 45 upon the metal lath. It will be understood that the feed rolls may have any form most suitable for feeding the particular type of metal latch used. The fibrous pulp from the stock chest 46 is moved by a paddle wheel 50 in predetermined amount into an auxiliary chamber 51 having an opening 52 through which the pulp falls upon a trough 53 and is conveyed thereby into a lower trough 54 having spaced partitions 55 which provide a plurality of spaced passengers 56.

Adjacent the lower end of the lower trough 54, a frame 58 is provided carrying a plurality of inverted channel shaped members 59 alined with the partitions 55 in the lower trough 54. These channel shaped members in the embodiment illustrated are arranged to enclose the ribs 45 of the metal lath and a predetermined area upon each side thereof. It will be understood, however, that the channel shaped members 59 may be arranged to enclose any given areas of the metal lath. The fibrous pulp flows along the passages 56 and is deposited upon and entangled with the strands of the metal lath between the channel shaped members 59 in spaced strips $s'$ so as to leave exposed areas $e'$ therebetween. An endless belt 60 is provided below the frame 58 and is supported upon rolls 61 adjacent the lower surface of the metal lath and is adapted to prevent the metal lath bending down and becoming displaced and also prevent an injurious amount of water in the pulp forcing its way through the metal sheet.

At this time the strips $s'$ of fibrous material deposited upon the metal lath contain a considerable amount of water which is removed in part by passage between squeeze rolls 63 and 64. It has been found that a better lath is obtained if the edges of the strips are trimmed by removing the fibrous material from the uneven edge areas $m$ of the strips. With this in view, the lath material may be passed through one or more mechanisms for removing the uneven edge areas. A suitable mechanism for this purpose may comprise a plurality of rolls 65 which are spaced to enclose the top of the main body of the strips of fibrous material. A similar set of rolls 66 are provided below the metal lath and enclose the bottom of the strips. The metal lath is fed between the rolls 65 and 66 leaving the uneven edge areas of the strips exposed. The exposed edge portions are forcibly removed in the present instance as by means of jets of fluid, such as water, ejected from nozzles 67 preferably positioned at opposite sides of each of the rolls 65. These nozzles are shown as supplied with fluid from a suitable header 68$^a$ and main 68. In this manner the edges of the strips $s'$ are well defined as shown at $n$ in Fig. 9. Part of the water remaining in the fibrous stock is then removed by passage of the material between squeeze rolls 69 and 70, and thence the lath material is fed underneath a roll 73 over a suction device by means of which the greater part of the remaining water is removed from the pulp material. A wire mesh screen, such as shown at 42 in Fig. 1, is preferably interposed between the perforated suction pipe 72 and the lath material as it travels beneath the roll 73, so as to preclude displacement of the fibre pulp from the strands of the metal lath by the force of suction from the suction device.

While we have shown in the drawing and described herein the formation of strip material provided with strips of fibre alternating with strips of bare lath, we do not limit our method to the production of such material as it will be apparent that exposed areas of other shapes can be produced by covering up whatever area is to form the fibrous area of the finished material and removing the stock from the remaining areas; nor do we limit ourselves to the use of belts or rolls as the means of protecting portions of the surface of the material.

It will be seen from the foregoing that we have provided an apparatus and process whereby the expanded metal lath may be wholly or partially embedded in fibrous material or stock suspended in water. This pulp material is preferably composed of a relatively small quantity of fibres suspended in a large quantity of water, and in applying the method the fibres will gather, or entangle, on the strands of the metal lath, so that they will be matted around these strands, while allowing the water to drain off underneath during the travel of the sheet through the machine.

In the present instance the machine is constructed so that the sheet of expanded metal lath may be fed continuously through the mechanism, although in carrying out the method in its broader aspect the mechanism as well as the mode of operation may be varied depending upon the nature of the final product desired.

It will also be seen that the invention enables the fibrous material to be initially deposited and felted on the metal lath in restricted areas, as illustrated in Figs. 3, 4 and 6; or the entire metal lath may be initially covered as illustrated in Figs. 1 and 2. Certain predetermined portions or areas of the covered surface may then be removed preferably by enclosing or covering the remaining portions and areas, and ejecting a fluid against the unprotected or unenclosed portions.

In the embodiment shown in Figs. 3 to 7 inclusive, the pulp material may be flowed or deposited on the moping sheet of metal lath in separated sections, leaving longitudinal bare or exposed strips, which may of course be of any desired width. When the sheet is pressed between the rolls 63 and 64 to squeeze out part of the water from the pulp material, the latter spreads laterally somewhat resulting in the formation of uneven or ragged edges. Hence, as the sheet passes between the squeeze rolls 65 and 66, which further extract water from the material, we prefer to employ means, such as jets 67, to remove forcibly sufficient of the material so as to produce straight and substantially even marginal edges thereby providing a more desirable and satisfactory product.

What we claim is:

1. The method of making lath material which comprises depositing on a sheet of metal lath fibrous material, and allowing said material to become entangled in the strands of certain areas of said lath while leaving the strands of other areas exposed.

2. The method of making lath material which comprises depositing on a sheet of metal lath fibrous material, and removing said material from certain areas of the metal lath.

3. The hereindescribed process for making lath material, which comprises the steps of exposing certain areas of a sheet of metal lath and covering other areas thereof, and depositing fibrous material upon the sheet to cover only the exposed areas.

4. The method of making lath material which comprises entangling fibrous material upon the strands of a metal lath, and forcibly removing said fibrous material from certain areas thereof by ejecting a fluid upon said areas.

5. The method of making lath material which comprises entangling fibrous material suspended in water upon the strands of a metal lath, removing a portion of the water therefrom, and removing said fibrous material from certain areas of said lath.

6. The method of making lath material which comprises entangling fibrous material upon the strands of a metal lath, protecting certain areas of said material, and forcibly removing the remaining areas of said material by ejecting a fluid thereon.

7. The method of making lath material which comprises entangling fibrous material suspended in water upon the strands of a metal lath, removing a portion of the water therefrom, protecting certain areas of said material, and forcibly removing the remaining areas of said material by ejecting a fluid thereon.

8. The method of making lath material having certain portions covered with fibrous material and the remaining areas exposed, which consists in enveloping the strands of a sheet of metal lath in a layer of fibrous material over an area thereof, and subsequently washing off the said fibrous material from those portions of the area where the strands are to be exposed.

9. The method of making lath material having certain areas covered with fibrous material and the remaining areas exposed, which consists in flowing onto a sheet of metal lath a fluid body containing fibrous material, removing a portion of the fluid therefrom, and subsequently washing said fibrous material from the strands of certain areas to expose the same.

10. The method of making lath material having certain areas covered with fibrous material and the remaining areas exposed, which consists in enveloping the strands of a sheet of metal lath in a layer of fibrous material, covering predetermined areas of said layer of fibrous material, and washing off the fibrous material from the remaining areas to expose the strands.

11. The method of making lath material having certain areas covered with fibrous material and the remaining areas exposed which consists in enmeshing a sheet of metal lath in a layer of fibrous material over substantially the entire area, protecting on both sides of the sheet predetermined areas of said layer of fibrous material, and washing off the fibrous material from the remaining areas to expose the strands.

12. The method of making lath material which comprises depositing on a sheet of metal lath fibrous material to permanently embed the strands of certain areas of said lath in said material, and leaving the strands in other areas exposed.

13. The method of making lath material which comprises depositing a fluid body of fibrous material upon certain areas of a sheet of metal lath while maintaining certain other areas bare, and causing the strands of said first named areas to be permanently embedded in said material.

14. The method of making lath material which comprises depositing a fluid body of fibrous material upon spaced areas of a sheet of metal lath to cause said material to envelop the strands of the metal lath, and removing said material from the edges of said spaced areas.

15. An apparatus for making lath material having certain areas covered with fibrous material and the remaining portions exposed, which comprises means for entangling fibrous stock upon a metal lath, and means for removing said material from certain areas of said lath.

16. An apparatus for making lath material having certain areas covered with fibrous material and the remaining portions exposed, which comprises means for supporting a metal lath, and means for supplying fibrous stock upon the lath to cause said stock to become entangled in the strands of certain areas while leaving the strands of other areas exposed.

17. An apparatus for making lath material having certain areas covered with fibrous material and the remaining portions exposed which comprises means for depositing fibrous stock upon a metal lath, means for defining certain areas from which said stock is to be removed, and means for removing the stock from said areas.

18. An apparatus for making lath material having certain areas covered with fibrous material and the remaining portions exposed, which comprises means for applying fibrous stock upon the strands of a metal lath, means for protecting predetermined areas of said stock, and means for removing the stock from the remaining areas.

19. An apparatus for making lath material having certain areas covered with fibrous material and the remaining portions exposed, which comprises means for applying fibrous stock upon the strands of a metal lath, means for protecting predetermined strips of said stock, and means for removing stock from unprotected areas.

20. An apparatus for making lath material having certain areas covered with fibrous material and the remaining portions exposed, which comprises means for supporting a sheet of metal lath, and means for supplying fibrous stock upon the metal lath in spaced longitudinal sections with the portions of the lath exposed intermediate said sections.

21. An apparatus for making lath material having certain areas covered with fibrous material and the remaining portions exposed which comprises means for depositing a fluid body of fibrous stock upon a metal lath, and means for enclosing certain areas of said lath while said stock is being applied.

22. An apparatus for making lath material having certain areas covered with fibrous material and the remaining portions exposed which comprises a supporting means, means for feeding metal lath over said supporting means, means for depositing wet fibrous stock upon said lath during its travel, and means for removing portions of said stock to leave the strands in certain areas of said lath exposed.

23. An apparatus for making lath material having certain areas covered with fibrous material and the remaining portions exposed which comprises means for supplying wet fibrous stock upon the strands of a metal lath, and nozzles for ejecting a fluid to forcibly remove the stock from predetermined areas of the lath.

24. An apparatus for making lath material having certain areas covered with fibrous material and the remaining portions exposed which comprises means for supplying wet fibrous stock upon the strands of a metal lath, nozzles for ejecting a fluid to forcibly remove stock from predetermined areas of the lath, and means for defining said areas while said stock is being removed.

25. An apparatus for making lath material having certain areas covered with fibrous material and the remaining portions exposed, which comprises means for supplying fibrous stock upon the strands of a metal lath, a movable member adapted to enclose predetermined areas of certain stock, and nozzles for ejecting a fluid against the stock adjacent said member to forcibly remove the same.

26. An apparatus for making lath material having certain areas covered with fibrous material and the remaining portions exposed which comprises a trough member adapted to supply a fluid body of fibrous stock upon a metal lath, means for supporting a metal lath beneath said trough member, means for moving said members relatively, and means for causing said stock to be applied to the strands of said lath in spaced bodies.

27. An apparatus for making lath material having certain areas covered with fibrous material and the remaining portions exposed, which comprises a trough member adapted to supply a fluid body of fibrous stock, means for supporting a metal lath beneath said trough member, means for moving said members relatively, and nozzles for ejecting a fluid to remove said stock forcibly from predetermined areas of the lath.

28. An apparatus for making lath material having certain areas covered with fibrous material and the remaining portions exposed, which comprises a trough member adapted to supply a fluid body of fibrous stock, means for supporting a metal lath beneath said trough, means for moving said members relatively, means for ejecting a fluid to remove said stock forcibly from predetermined areas of the lath, and means for covering the remaining areas while said stock is being removed.

29. An apparatus for making lath material having certain areas covered with fibrous material and the remaining portions exposed, which comprises means for supplying a stream of fibrous stock, means for supporting a metal lath in position to receive said stock, means for moving one of said means relatively to the other, and means for removing said stock from predetermined areas of the lath.

30. An apparatus for making lath material having certain areas covered with fibrous material and the remaining portions exposed which comprises a trough adapted to supply wet fibrous stock, means for supporting a metal lath beneath said trough, means for moving said members relatively, and means for guiding said stock upon the lath in spaced bodies.

31. An apparatus for making lath material having certain areas covered with fibrous material and the remaining portions exposed which comprises a trough adapted to supply wet fibrous stock, means for supporting a metal lath beneath said trough, means for moving said members relatively, means for guiding said stock upon the lath in spaced bodies, and means for removing stock from predetermined areas of said bodies.

32. The apparatus for making lath material having certain areas covered with fibrous material and the remaining areas exposed which comprises means for flowing semi-liquid fibrous stock onto the surface of the metal lath, means for feeding the lath forward and nozzles ejecting water to wash the stock off predetermined areas of the expanded metal as the same passes the nozzles.

33. The apparatus for making lath material having certain areas covered with fibrous material and the remaining areas exposed which comprises means for flowing fibrous stock suspended in water onto the surface of a metal lath, means for feeding the lath forward, pairs of rolls, each pair arranged to enclose portions of opposite faces of the material, and nozzles located between said rolls adapted to eject a fluid upon the portions of said material not protected by said rolls during the travel of said lath thereby removing said portions of said material.

In testimony whereof we affix our signatures.

JOHN W. EDSON.
HERBERT S. STONE.
DAVID B. ARNOLD.